(12) United States Patent
Gaumnitz et al.

(10) Patent No.: US 11,263,196 B2
(45) Date of Patent: *Mar. 1, 2022

(54) FASTER ACCESS FOR COMPRESSED TIME SERIES DATA: THE BLOCK INDEX

(71) Applicant: SAP SE, Walldorf (DE)

(72) Inventors: Gordon Gaumnitz, Walldorf (DE); Robert Schulze, Walldorf (DE); Lars Dannecker, Dresden (DE); Ivan T. Bowman, Kitchener (CA); Daniel James Farrar, Kitchener (CA)

(73) Assignee: SAP SE, Walldorf (DE)

( * ) Notice: Subject to any disclaimer, the term of this patent is extended or adjusted under 35 U.S.C. 154(b) by 188 days.

This patent is subject to a terminal disclaimer.

(21) Appl. No.: 16/358,598

(22) Filed: Mar. 19, 2019

(65) Prior Publication Data

US 2019/0243816 A1 Aug. 8, 2019

Related U.S. Application Data

(63) Continuation of application No. 14/326,400, filed on Jul. 8, 2014, now Pat. No. 10,248,681.

(51) Int. Cl.
*G06F 16/23* (2019.01)
*G06F 16/951* (2019.01)
*G06F 16/22* (2019.01)

(52) U.S. Cl.
CPC ...... *G06F 16/2322* (2019.01); *G06F 16/2237* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 2011/0218978 A1* | 9/2011 | Hong | G06F 16/2477 707/694 |
| 2013/0166566 A1* | 6/2013 | Lemke | G06F 16/24553 707/741 |

* cited by examiner

*Primary Examiner* — Alford W Kindred
*Assistant Examiner* — Soheila (Gina) Davanlou
(74) *Attorney, Agent, or Firm* — Mintz Levin Cohn Ferris Glovsky and Popeo, P.C.

(57) ABSTRACT

A system and method for faster access for compressed time series data. A set of blocks are generated based on a table stored in a database of the data platform. The table stores data associated with multiple sources of data provided as consecutive values, each block containing index vectors having a range of the consecutive values. A block index is generated for each block having a field start vector representing a starting position of the block relative to the range of consecutive values, and a starting value vector representing a value of the block at the starting position. The field start vector of the block index is accessed to obtain the starting position of a field corresponding to a first block and to the range of the consecutive values of the first block. The starting value vector is then determined from the block index to determine an end and a length of the field of the first block.

17 Claims, 10 Drawing Sheets

Field-Start-Vector  Run the vector to the next different index value.

Block-Index  Use length as separators in block-index.

Figure 13. Field length determination options.

Figure 5. Enhanced time stamp dictionary with constant memory consumption.

Figure 6. Enhanced time stamps dictionary with support for gaps.

Figure 7. Large skinny table design of time series tables.

FIG. 5

Figure 12. Block-index compression.

Figure 13. Field length determination options.

FASTER ACCESS FOR COMPRESSED TIME SERIES DATA: THE BLOCK INDEX

CROSS-REFERENCE TO RELATED APPLICATIONS

The present application claims priority to and incorporates by reference the entire content of patent application Ser. No. 14/326,400 filed on Jul. 8, 2014 pursuant to 37 CFR § 120.

TECHNICAL FIELD

The subject matter described herein relates to data processing platforms, and more particularly to a system and method for compressing an index vector of series data of a database.

BACKGROUND

FIG. 1 is a block diagram of a data processing system 100. The data processing system 100 includes a data platform 102 that receives and/or transmits data to one or more external data sources 103. The data platform 102 can be, without limitation, a web server including one or more server computers and one or more processors. The external data sources 103 can be, without limitation, client computers including one or more processors, but can also include server computers, mobile computing devices, desktop or laptop computers, and the like.

The data platform 102 includes a storage layer 104 for storing data received from the one or more external data sources 103. The storage layer 104 can include a database, such as an in-memory database or hard-disk drive database. Consistent with implementations described herein, the storage layer 104 further includes a column store 106, and may also include a row store 108. Series data 110, such as time stamps or other serial or regular interval-based data, is preferably stored on column store 106.

When dealing with series data in the storage layer of an data platform, improving memory consumption and general performance in a manner that is virtually transparent to the user, and involves an ease of use when handling this kind of data using an extensive number of time series analysis functionality, is very challenging.

SUMMARY

This document describes various storage extensions, which are specifically adapted to the characteristics and requirements of time series data. The extensions comprise special compression formats for time stamps. In particular, this document describes systems and methods for compressing an index vector of time series tables stored in a database.

In one aspect, a computer-implemented method includes generating a set of blocks based on a table stored in a database of the data platform, the table storing data associated with multiple sources of data provided as consecutive values, each block containing index vectors having a range of the consecutive values. The method further includes generating a block index for each block, the block index having a field start vector representing a starting position of the block relative to the range of consecutive values, and a starting value vector representing a value of the block at the starting position.

The method further includes accessing, in response to a query to the data platform, the field start vector of the block index to obtain the starting position of a field corresponding to a first block, the field corresponding to the range of the consecutive values of the first block. The method further includes determining, based on the accessing, the starting value vector from the block index to determine an end and a length of the field of the first block, and determining selected blocks from the set of blocks where a queried value occurs based on the accessing and reading of the block index, where the consecutive values represent time series data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 illustrates a large "skinny table" design of time series tables.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide index vector compression for time series tables of blocks of time series data.

Figure 1:
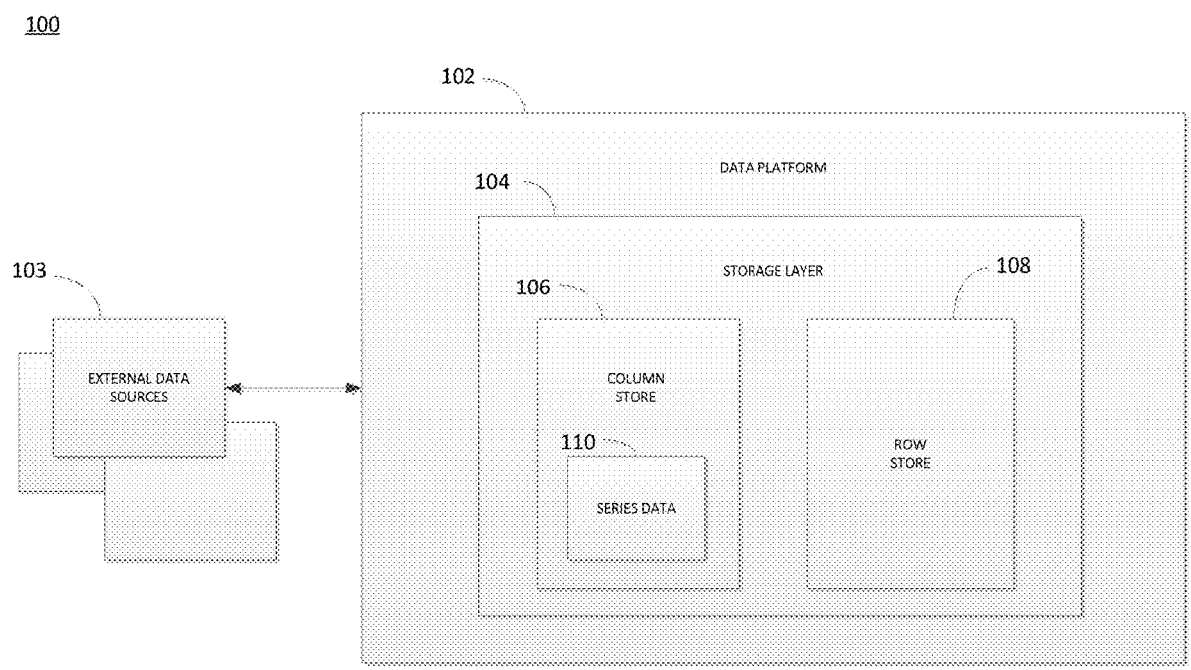
FIG. 1 is a diagram illustrating aspects of a data processing system showing features consistent with implementations of the current subject matter.
Figure 2:
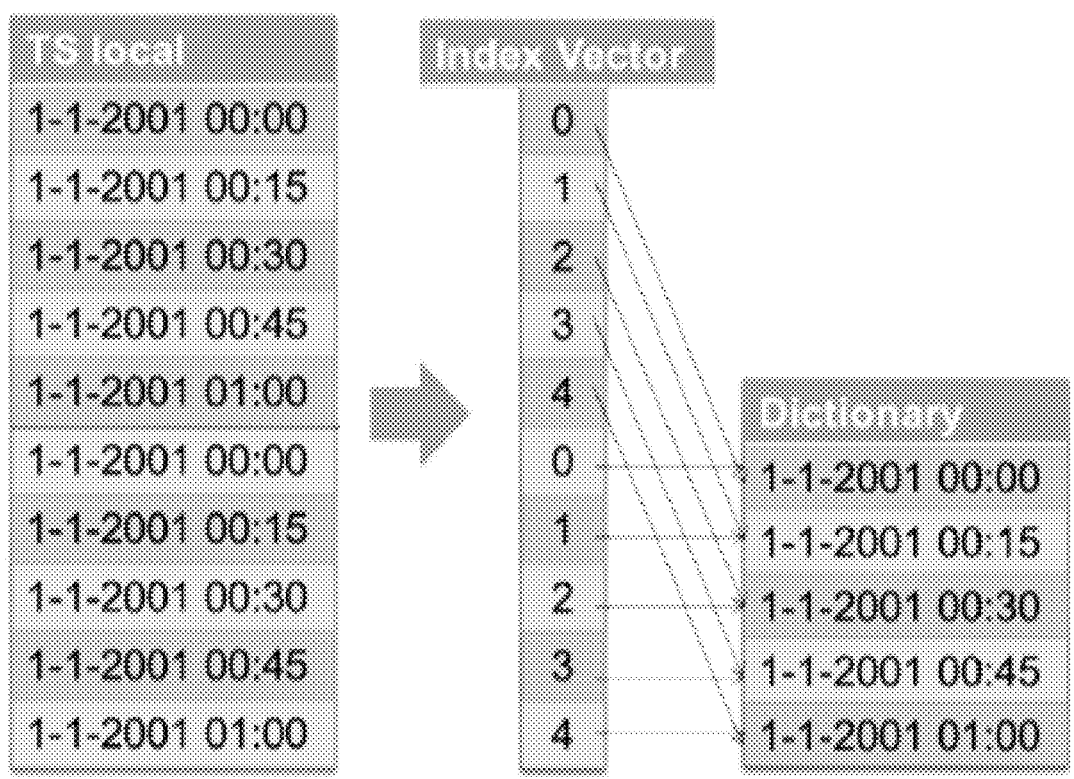
FIG. 2 shows a conventional time stamp dictionary approach.

The database system stores time stamps, typically using standard dictionary encoding. This means that all time stamps considered in the column are stored within a dictionary and that the actual values in the column are replaced by integer references ("value-ids") pointing into the dictionary. When reading dictionary encoded time stamps, the respective value-ids are read in the index-vector, and the respective position is searched for in the dictionary. This is illustrated in FIG. 2. Since all time stamps available in the table are stored in the dictionary, the memory consumption increases linearly with the number of distinct time stamps.

However, memory consumption of equidistant time series can be optimized, since one of their major characteristics is a consistently progressing (increasing or decreasing) time. In particular, adjacent time stamps exhibit equal deltas between them. Thus, using the starting time $T_s$ and the respective time interval I, the timestamp for every entry in the time series at its position i can be calculated.

Figure 3:
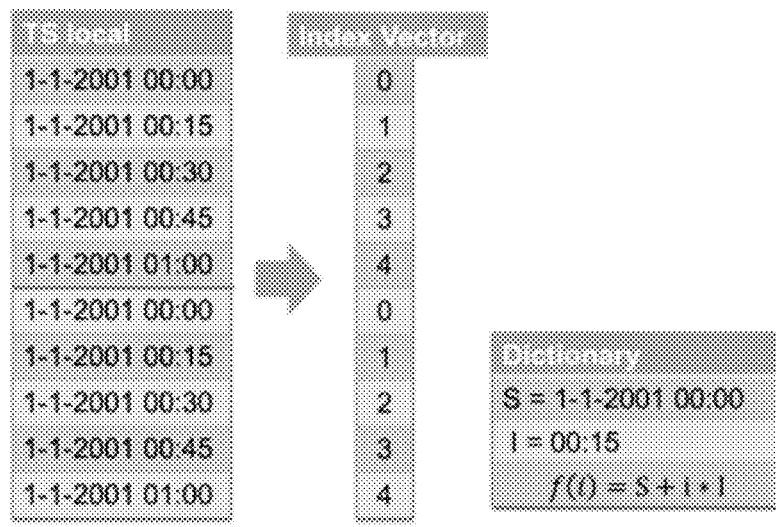
FIG. 3 shows an enhanced time stamp dictionary with constant memory consumption.

Accordingly, in an optimized time series dictionary, only the starting time and the time interval of the time series is stored, instead of storing the actual time stamps. Furthermore, the index vector for an equidistant time series exactly represents the entry positions within the time series, resulting in a likewise constantly increasing or decreasing sequence of index values. This approach is illustrated in FIG. 3. When reading values from the series table, the time stamps can be determined as:

$$T_i = i*I + T_s$$

With this optimization, the dictionary is constant in size, instead of increasing linearly with the number of time stamps.

One major requirement of the time series dictionary is that it needs to contain a complete, gapless, consecutive sequence of time stamps. A missing time stamp is not supported and will break the dictionary, since in this case the index value no longer complies with the positions of the time stamps in a time series. As a result, while the dictionary supports missing values in a subset of time series contained in a table, it does not support gaps in the timestamps. In this regard, a gap in the time stamps of a (multi-variate) time series means that all sub time series considered in a table do not exhibit a value for a specific time stamp given by the natural time stamp sequence. Thus, a gap breaks the requirement of the current dictionary approach that it needs to contain all distinct time stamps form a gapless, consecutive, ordered sequence. Since some use-cases also need support for gaps in time series, the dictionary compression can be further enhanced to support this special case.

Figure 4:
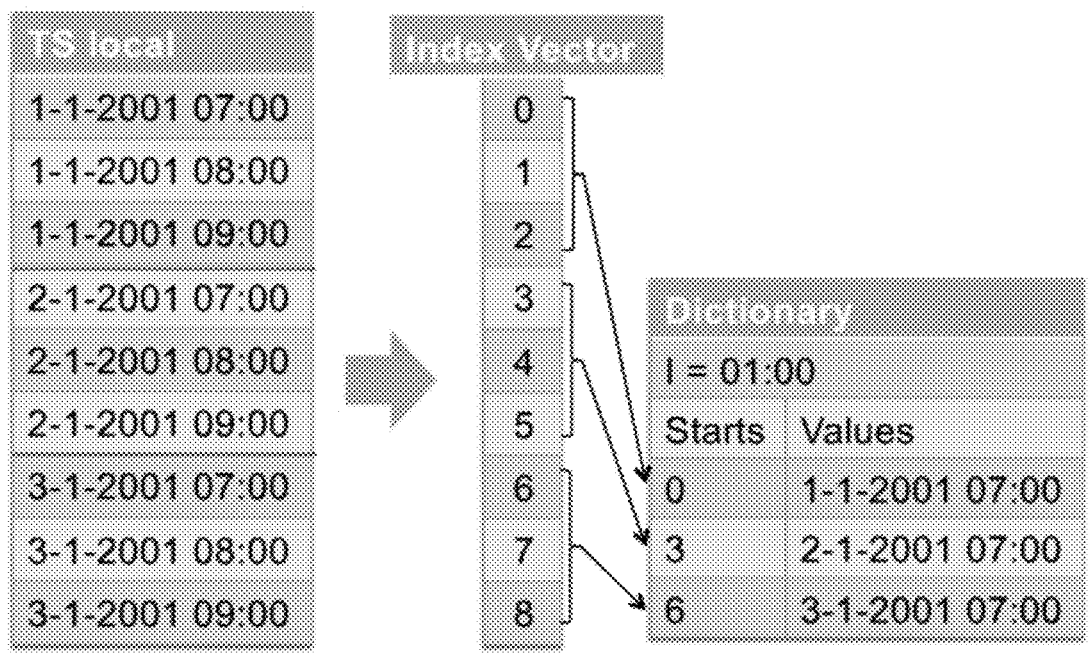
FIG. 4 shows the enhanced time stamp dictionary with constant memory consumption with support for gaps.

In accordance with implementations consistent with the compression techniques described herein, the time stamps are divided into multiple blocks, where each block contains only a gapless sequence of time stamps. For this purpose, the time stamps are divided directly at the borders of the gaps existing in a time series. The support for multiple blocks comes with the requirement of storing the starting points as well as the first value of each block. In principal, this approach can be seen as having multiple sub-dictionaries each storing the time stamps of separate strictly equidistant time series. This is illustrated in FIG. 4.

The starts-vector connects the index values of the index-vector to the respective blocks. The values vector describes the respective starting time stamp for each of the blocks. Thus, given a specific index vector value, the starts vector is first scanned until the respective block in which the value is contained is found. With that, the position of the starting value of the respective block in the starting values vector is retrieved. With those two units of information, the time stamps are calculated as described for the general time series dictionary.

Adding gap support increases the memory consumption of the dictionary compared to the constant memory consumptions of the standard time series dictionary, since the two additional vectors "starts" and "starting values" consume additional memory. Thus, the memory consumption of the dictionary in the latter case depends on the number of blocks, and therefore, indirectly on the number of gaps that are present in the data. In addition, operations on the dictionary are now required to access two additional vectors. Scanning the starts vector, for example, requires a binary search with a complexity of log(n), where n is the number of values considered, instead of a constant complexity when accessing values in the former approach.

While an equidistant time series is preferably used, the techniques described above can apply to a dictionary that supports regular gaps, such as no data records on holidays, data only being available during working days (i.e., excluding weekends), and/or data only being recorded during defined hours per day (i.e., business hours). Additional layers can be added on top of the above-described implementations to allow for a faster access to requested timestamps.

Using dictionary compression, the original time stamps in the respective columns are replaced by integer values serving as index pointers to the dictionary. Such an index vector is illustrated in FIGS. 2 and 3. Index vectors are typically subject to run length encoding, which is especially efficient when consecutive values repeat within the respective columns. However, this conflicts with some table designs for time series data—namely, large skinny tables. FIG. 5 illustrates one such table design, in which time series data from multiple meters are stored.

Data in the table is ordered first by the id of the respective series, and afterwards by time stamp. It can be seen that the series id is suited for run length encoding, since the values repeat for the entire time series of a meter. However, for the resulting index vector of the respective time stamp columns, incrementing integer values forming "blocks" of length $n=a_1, \ldots a_n$ with $a_i=a_{i-1}+/-1$ are often observed. The reason is that equidistant time series typically exhibit a continuously increasing time.

Figure 6:
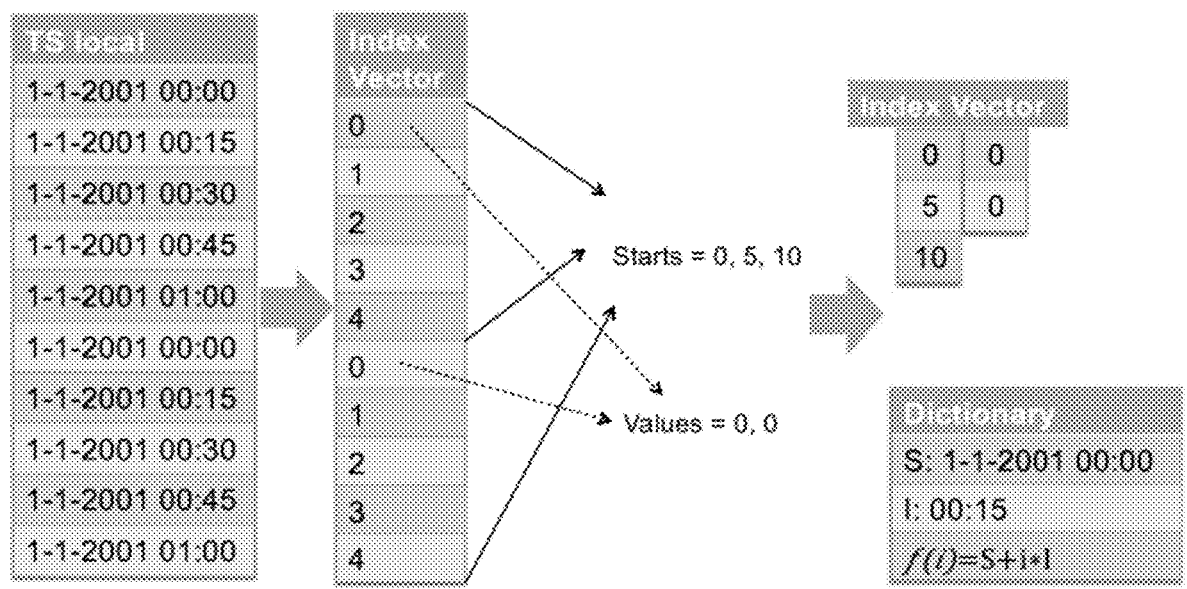
FIG. 6 shows a general design of linear run length encoding (LRLE).

This behavior can be used to create a variant of the standard RLE compression specifically tailored to the incrementing/decrementing behavior of time series index vectors. This variation is called linear run length encoding (LRLE), and is illustrated in FIG. 6.

With LRLE, instead of storing the single index values for each meter, only characteristic information about the blocks that follow the simple increment rule is stored. For this purpose, only two data elements (integer values) per block is needed, namely, the position of the starting element of a block, and the value with which the block starts. Accordingly, the following pair of information is stored:

INDEX_BLOCK::=(startPosition,firstElement)

With these two pieces of information, the following other information can be calculated: the block in which an index value is contained, specific time stamp values using the standard time series dictionary calculation rule, and the length of specific blocks by using the start position of the requested and the following block.

Using the start positions and the first elements as an information pair has the advantage that the index in the vector comprising the start positions directly corresponds to the block number (block number—1, due to zero-based vector indexes). Thus, the starting value for the first block can be found at index position 0 and for the sixth block at index position 7. With that a linear access to the starting values vector is enabled, instead of requiring a binary search to find the respective position. The last entry in the starting values vector marks the end of the all runs and does not have an entry in the first elements vector.

The compressed data is stored using two vectors, one containing the starting positions and one containing the starting values.

vector<int> startPositions;
vector<int> firstElements;

This implementation ensures consistency between both vectors, as well as consistency of the index vector at all times. However, the most common operation with respect to time series data is a simple append, which does not spoil the consistency of the index vector in the LRLE implementation.

In some implementations, the index vector compression can be further enhanced in which appending values does not recreate the entire index vector, and appending values simply adds an additional entry at the end of the index vector by either increasing the end marker or starting a new block. In the time series case, this is also true for the startingValues and firstElements vectors. Further, this behavior is supported by adding a special method to the current index vector implementation, or by adding a special custom merge.

In an alternative implementation for implementing the LRLE compression, a vector of structs containing both pieces of information—the starting position as well as the value of the first element can be used, as follows:

```
struct index_block {
    int startPosition;
    int firstElement;
};
vector<index_block> indexVector;
```

The two types of compressions described above substantially reduce memory consumption, but may increase access times when requesting and accessing values stored in the database. For this reason, a compressed block-index is provided, in multiple variations, again increasing the efficiency for accessing the values, without decreasing the benefits of the compression approaches. The enhanced block-index is based on the current block-index implementation within the in-memory data platform that can be found in the BlockIndex class of the Attribute Engine.

The index can quickly identify in which blocks a specific value occurs, without having to scan the entire compressed column. Recall that a block is a range of consecutive values within the index vector, which often occurs when dealing with time series data. In accordance with some implementations of the subject matter herein, the block-index is a two-level index. The first level enables an efficient access to the main (second-level) index and the main (second-level) block-index increases the efficiency when accessing the actual data in the index vector. In the main block-index, for each value occurring in the index vector, the ids of the blocks it occurs in are stored. There, the main block-index stores the information in fields, where one field contains all ids of relevant blocks for one index value. The fields are in numeric order (zero-based), meaning that the information for the third index-value 2 (0,1,2) is in the third field in the main block-index.

Figure 7:
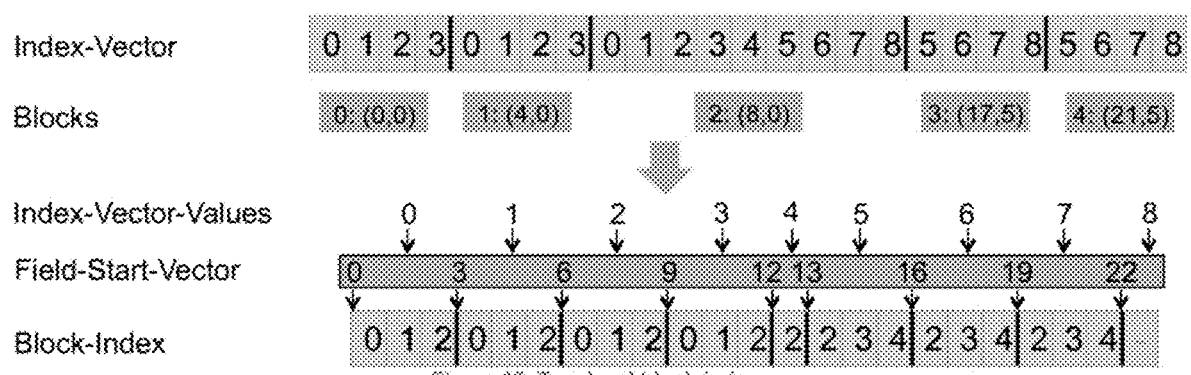
FIG. 7 shows an implementation of LRLE, with a two-level block index.

FIG. 7 illustrates the general approach of the block-index. FIG. 7 shows an example index vector and its five blocks resulting from the LRLE encoding. The index vector contains a range of values, such as from 0 to 8, for which the block-index needs to encode information. Each of the fields in the block-index is exactly at the position corresponding to possible index-vector-values. Index-vector-value 1 for example is contained in the blocks: 0,1,2. Since the index-vector-value 1 is the second value starting from zero, only this information is stored in the second field of the block-index, where in the example each field is illustrated by a darker line.

Fields are virtual constructs to make it easier to understand the concept of the block-index. The block-index remains a standard vector of consecutive values. Thus, finding a field means scanning the block vector until a specific entry is found. To avoid scanning the entire main block-index when searching for fields, the starting points of each field are added in a field-start-vector, which forms the first level of the block-index. As a result, for each index-vector-value, the field-start-vector is first accessed at the position corresponding to the value of the index-value (zero-based) to gain the starting position of the respective field. The subsequent value is also read to determine the end, and with that the length of the field. Afterwards, the block information for the index-value is read from the main block-index, and thereafter only blocks in the actual data need to be accessed, where the respective index-value occurs.

Figure 8:
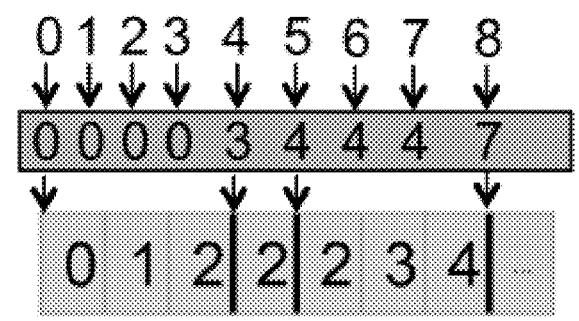
FIG. 8 illustrates compression of a block-index.

Since the block-index in its current form is a full inverted index, its size is similar to the size of the original (uncompressed) index vector. For this reason, the block-index can also be compressed. In the example in FIG. 8, repeating block information within the block-index can be clearly seen, which requires run-length encoding. For equidistant, multivariate time series, these repetitions are assumed to be a typical behavior, since the contained sub-time-series typically comprise similar time frames. In most cases deviations only occur in the beginning or at the end of multivariate time series, while the main part should be equal. However, this greatly depends on the respective use case, which means that different time series tables provide different potential for compressibility. This behavior is illustrated in FIG. 8. Each of the sub-time series turns into a block created from the large skinny table using dictionary and LRLE compression.

Figure 9:
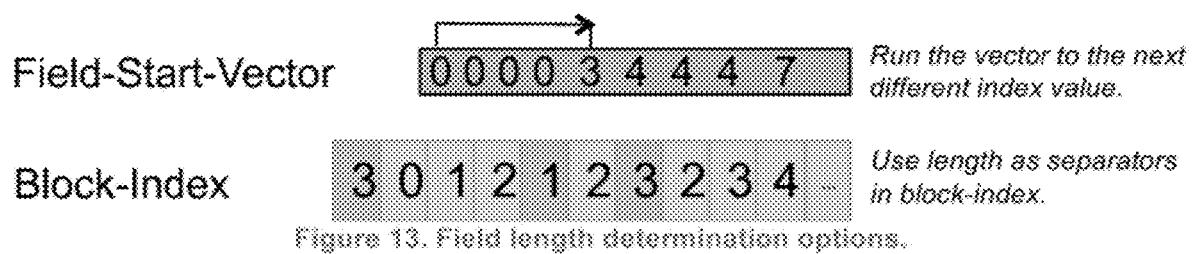
FIG. 9 illustrates a compression approach.

The compression now condenses all equal subsequent fields in the block-index and replaces them by only a single entry. This greatly reduces the size of the block-index. The compression approach is illustrated in FIG. 9. As shown in FIG. 9, the field-start-vector is maintained in an uncompressed form, since the direct connection between index-values and position in the field-start-vector is kept, resulting in a constant access time from this access scheme, which provides a very efficient index access. Thus, the field-start-vector remains constant in size and contains multiple equal values as pointers to the compressed block-index fields.

Under this compression approach, it gets more complicated to retrieve the length information of the respective fields. Recall that in the uncompressed case, the current and the following entry in the field-start-vector are read to retrieve the starting position and to calculate the length of the respective field. In the block-index compression, the length of the field can only be calculated when scanning the entire field-start-vector until a value larger than the current one is found, as illustrated in FIG. 9.

As the block-index includes many fields, this search could potentially become computationally expensive. To avoid possible performance degeneration, the block-index can be modified by adding the length of the respective current field as a separator. The length information is directly read from the block-index fields instead of being calculated. The field is added at the position the field-start-vector refers to, which means that the first value read states the length of the field and the following values represent the block information. This avoids scanning the field-start-vector and results again in a constant access time.

In the unlikely event that there are no similarities between the used time stamps within an equidistant, multivariate time series, the compression approach simply arrives at the same result as a non-compressed block-index, with the exception that the block-index now contains the length information.

As discussed above, four possible options for implementing the block-index are presented and compared Table 1, although other options and combinations are possible.

the memory, but greatly deteriorates performance; since full column scans need to be performed to find the blocks containing a specific value. In contrast, using an uncompressed index consumes the most memory, but is also the fastest solution when searching corresponding blocks. Since the extreme cases are difficult to address automatically, a general configuration can be done by the user only once, considering the following three options:

Memory: The memory option would configure the series data components to use as little memory as possible. In the case of the block-index this would result in no index at all. This option is automatically chosen in low-memory situations.

Performance: In this case maximum performance is the main target and memory consumption is a secondary target. With respect to the block-index, the index would not be compressed at all. For optimal performance, none of the previously proposed techniques would be used, but rather a simple uncompressed inverted index over the time stamp column can be used. However, using no compression at all would substantially increase memory consumption.

Balanced: This is the standard option and chosen if no user preference is configured. In this case the system tries to balance between memory consumption and performance, resulting in the selection of one of the two compressed block-index variations. The concrete variation is then chosen based the data.

Figure 10:
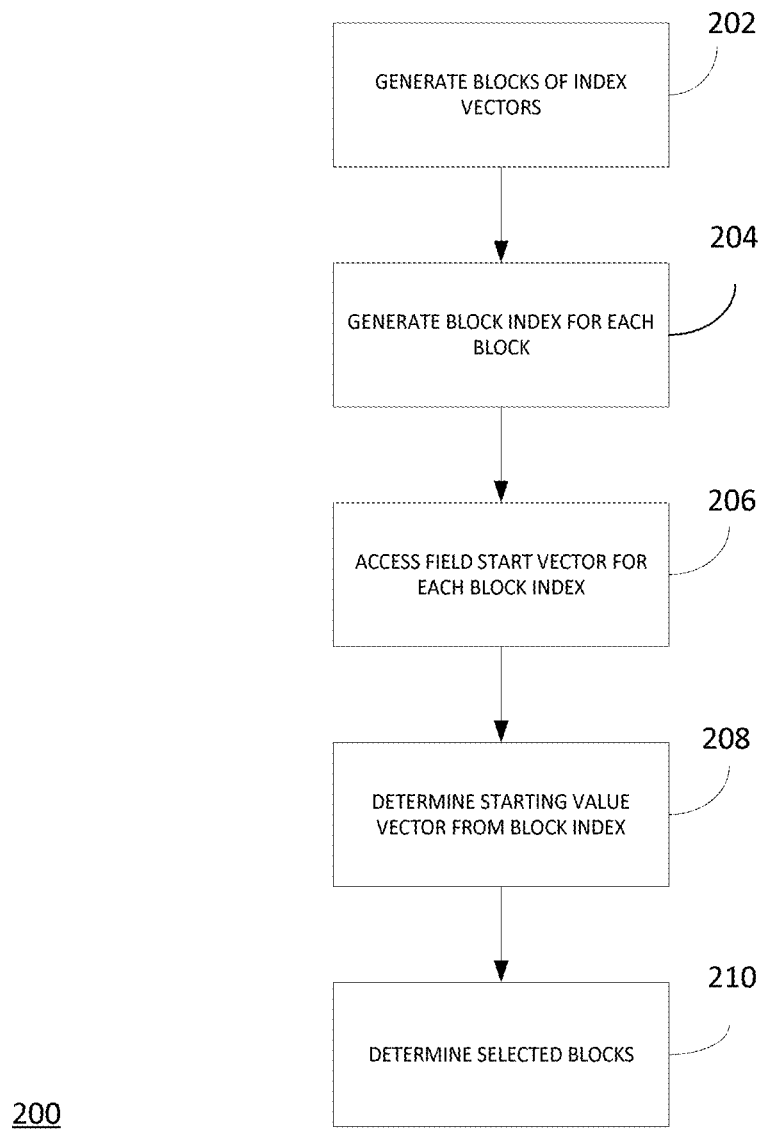
FIG. 10 is a process flow diagram illustrating aspects of a method having one or more features consistent with implementations of the current subject matter.

FIG. 10 is a flowchart 200 of a method for faster access compressed time series data using a block index. At 202, one or processors of a data platform generates a set of blocks based on a table stored in a database of the data platform. The table stores data associated with multiple sources of data provided as consecutive values, and each block contains index vectors having a range of the consecutive values. At 204, the one or more processors generates a block index for each block, the block index having a field start vector representing a starting position of the block relative to the

TABLE 1

Comparison: Block-index types.

| | Type | Description | Memory | Performance | Recommendation |
|---|---|---|---|---|---|
| 1 | No Index | No block-index is used. Entire column is scanned | ++ | -- | Recommended when lowest memory consumption is required |
| 2 | Compressed block-index (no separator) | Block-index used. Missing block length information | - | + | Recommended for short and totally equal blocks |
| 3 | Compressed block-index (with separator) | Block-index storing information inclusive | - | ++ | Recommended for long and equal blocks |
| 4 | Uncompressed block-index | No further compression for the index is used | -- | ++ | Best performance, highest memory consumption |

In general, options 2 and 3 can be selected solely by analyzing the data. For short blocks scanning the field-start-vector remains computationally cheap. This means that a separator need not be added to the block-index, which would have slightly increased memory consumption. In addition, if all blocks are of equal length, the length information can be omitted completely, since the length is known beforehand. However, both time series characteristics are special cases and seldom occur, leaving the compressed block-index with separators as the preferred implementation for compressing the block-index.

The two other options shown in Table 1—namely, not using an index at all or using the uncompressed index—are extreme cases. Not using an index at all preserves most of range of consecutive values, and a starting value vector representing a value of the block at the starting position.

At 206, in response to a query to the data platform, the one or more processors accesses the field start vector of the block index to obtain the starting position of a field corresponding to a first block. The field corresponds to the range of the consecutive values of the first block. At 208 the starting value vector is determined from the block index to determine an end and a length of the field of the first block. At 210 selected blocks from the set of blocks are determined, where a queried value occurs based on the accessing and reading of the block index, and where the consecutive values represent time series data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible. Other implementations may be within the scope of the following claims.

What is claimed is:

1. A computer-implemented method comprising:
   generating a plurality of blocks based on an index vector, at least a first block comprising index vector values corresponding to consecutive sequence of values associated with a plurality of time stamps for a database;
   generating a block index for at least one block of the plurality of blocks and reducing size of the block index by condensing equal subsequent fields in the block index;
   accessing, in response to a query to the database, a field start vector of the block index; and
   determining, in response to accessing the field start vector, at least a length of a field corresponding to the first block, without scanning entirety of the condensed fields in the block index, wherein the consecutive sequence of values associated with the plurality of time stamps is optimized by storing a starting time and a time interval associated with the length of the field corresponding to the first block, wherein the block index comprises the field start vector and, for an index vector value of the index vector, a list of block numbers containing the index vector value, wherein the field start vector represents a starting position of a field corresponding to the first block that contains the index vector value.

2. The method of claim 1, wherein the index vector comprising index vector values corresponding to the consecutive sequence of values is stored in a table.

3. The method of claim 1, wherein the block index is stored in memory of a computing system in uncompressed form.

4. The method of claim 1, wherein the condensing reduces size of the block index thereby reducing memory consumption in the computing system.

5. The method of claim 1, wherein not scanning entirety of the condensed fields in the block index, increases the computing systems access speed to time stamp data stored in the first block.

6. The method of claim 1, wherein based on the accessing an end of the field of the first block is determined.

7. The method of claim 1, wherein selected blocks from the plurality of blocks where a queried value occurs are determined based on the accessing and reading of the block index.

8. The method of claim 1, wherein the consecutive values represent time series data stored within a database dictionary.

9. The method of claim 1, wherein the database includes an in-memory database having a hybrid store structure, the hybrid store structure comprising a column store and a row store.

10. A system comprising:
at least one programmable processor; and
a machine-readable medium storing instructions that, when executed by the at least one processor, cause the at least one programmable processor to perform operations comprising:
generate a plurality of blocks based on a table stored in a database of the data platform, the table storing data associated with multiple sources of data provided as consecutive values, each block containing index vectors having a range of the consecutive values;
generate a block index for each block, the block index having a field start vector representing a starting position of the block relative to the range of consecutive values, and a starting value vector representing a value of the block at the starting position;
access, in response to a query to the data platform, the field start vector of the block index to obtain the starting position of a field corresponding to a first block, the field corresponding to the range of the consecutive values of the first block, wherein the block index comprises the field start vector and, for an index vector value of an index vector, a list of block numbers containing the index vector value, wherein the field start vector represents a starting position of a field corresponding to the first block that contains the index vector value.

11. The system of claim 10, wherein the operations further comprise an operation to determine, based on the accessing, the starting value vector from the block index to determine an end and a length of the field of the first block.

12. The system of claim 11, wherein the operations further comprise an operation to determine selected blocks from the plurality of blocks where a queried value occurs based on the accessing and reading of the block index.

13. The system of claim 12, wherein the consecutive values represent time series data.

14. A computer program product comprising a non-transient machine-readable medium storing instructions that, when executed by at least one programmable processor, cause the at least one programmable processor to perform operations comprising:
generate a plurality of blocks based on a table stored in a database of the data platform, the table storing data associated with multiple sources of data provided as consecutive values, each block containing index vectors having a range of the consecutive values;
generate a block index for each block, the block index having a field start vector representing a starting position of the block relative to the range of consecutive values, and a starting value vector representing a value of the block at the starting position;
access, in response to a query to the data platform, the field start vector of the block index to obtain the starting position of a field corresponding to a first block, the field corresponding to the range of the consecutive values of the first block, wherein the block index comprises the field start vector and, for an index vector value of an index vector, a list of block numbers containing the index vector value, wherein the field start vector represents a starting position of a field corresponding to the first block that contains the index vector value.

15. The computer program product of claim 14, wherein the operations further comprise an operation to determine, based on the accessing, the starting value vector from the block index to determine an end and a length of the field of the first block.

16. The computer program product of claim 15, wherein the operations further comprise an operation to determine selected blocks from the plurality of blocks where a queried value occurs based on the accessing and reading of the block index.

17. The computer program product of claim 16, wherein the consecutive values represent time series data.

* * * * *